United States Patent
Nam et al.

[11] Patent Number: 6,089,146
[45] Date of Patent: Jul. 18, 2000

[54] TEMPERATURE SENSING DEVICE FOR FOOD STORAGE CONTAINER

[75] Inventors: Jae-wook Nam; Bo-youn Son, both of Chungcheongnam-do, Rep. of Korea

[73] Assignee: Mando Climate Control Corporation, Rep. of Korea

[21] Appl. No.: 09/438,480

[22] Filed: Nov. 12, 1999

[30] Foreign Application Priority Data

Dec. 21, 1998 [KR] Rep. of Korea ............ 98-25853

[51] Int. Cl.[7] ............... C12H 1/00; A23L 1/00
[52] U.S. Cl. ............... 99/468; 99/455; 99/470; 99/483; 99/486; 435/286.1; 435/289.1
[58] Field of Search ............ 99/276, 325–333, 99/451, 467, 468, 470, 472, 483, 486, 506, 493, 534, 535; 435/289.1, 286.1; 426/49; 73/861.41; 62/152, 155, 30

[56] References Cited

U.S. PATENT DOCUMENTS

| | | | |
|---|---|---|---|
| 3,752,731 | 8/1973 | Christ | 99/472 X |
| 3,809,618 | 5/1974 | Muller | 435/316 X |
| 3,978,918 | 9/1976 | Nagatomo et al. | 435/316 X |
| 4,062,276 | 12/1977 | Stahmann | 99/467 |
| 4,204,037 | 5/1980 | Dill et al. | 435/290.1 |
| 4,293,655 | 10/1981 | Christ et al. | 99/472 |
| 4,315,990 | 2/1982 | Sheets | 435/289.1 |
| 4,318,992 | 3/1982 | Mil-de-la-Roca et al. | 435/291.1 |
| 4,692,414 | 9/1987 | Yamada et al. | 435/291.1 |
| 4,746,615 | 5/1988 | Buchholtz et al. | 435/289.1 |
| 4,785,728 | 11/1988 | Miyata et al. | 99/535 X |
| 5,142,969 | 9/1992 | Chun . | |
| 5,414,210 | 5/1995 | Bae et al. | 435/289.1 |
| 5,555,797 | 9/1996 | Chun | 99/468 |

*Primary Examiner*—Timothy Simone
*Attorney, Agent, or Firm*—Harold L. Novick; Nath & Associates

[57] ABSTRACT

A temperature sensing device for a food storage container accurately detects the internal temperature of a storage chamber to achieve an accurate on/off control for heating and cooling cycles by minimizing a temperature fluctuation existing in the storage chamber. The temperature sensing device includes a temperature sensor to sense a temperature of the storage chamber and generate an electrical signal representative of the sensed temperature; a control unit, having a microprocessor, to control the cooling system based on the electrical signal generated by the temperature sensor; and a metallic fixing bracket for fixing the temperature sensor to the inner liner at a position near an inlet portion of an evaporator receiving a cooled refrigerant from a condenser, such that the temperature sensor is in close contact with the outer surface of an inner liner of the storage chamber, to establish a thermally conductive path between the inner liner and the temperature sensor. The fixing bracket has a sensor housing for tightly receiving the temperature sensor therein; and at least one pipe receptacle integrally extended from the sensor housing and fitting tightly around a first pipe portion of the inlet portion of the evaporator, to establish a thermally conductive path from the first pipe portion to the temperature sensor.

13 Claims, 3 Drawing Sheets

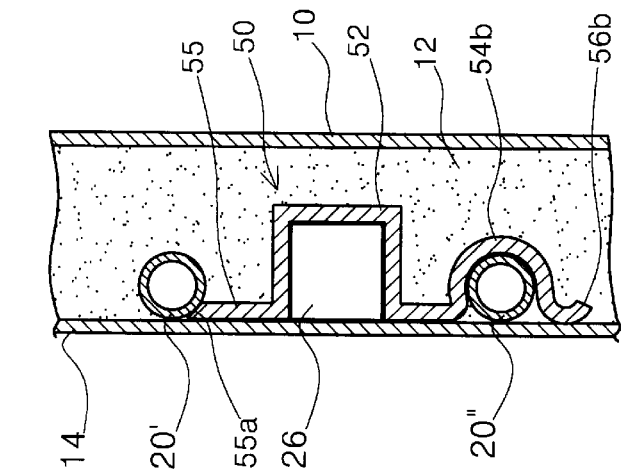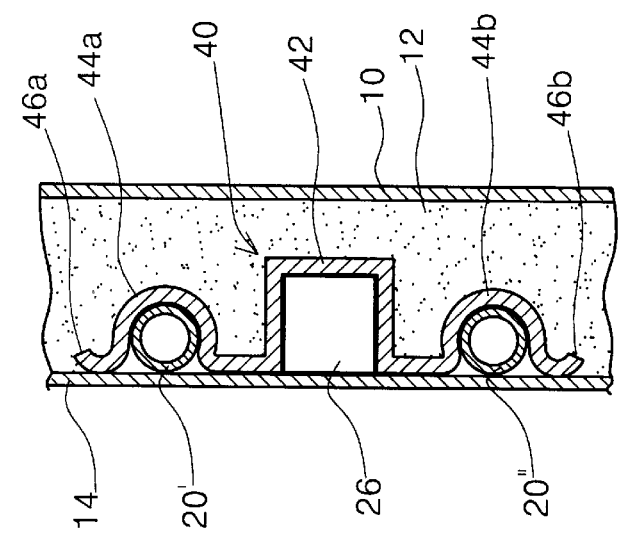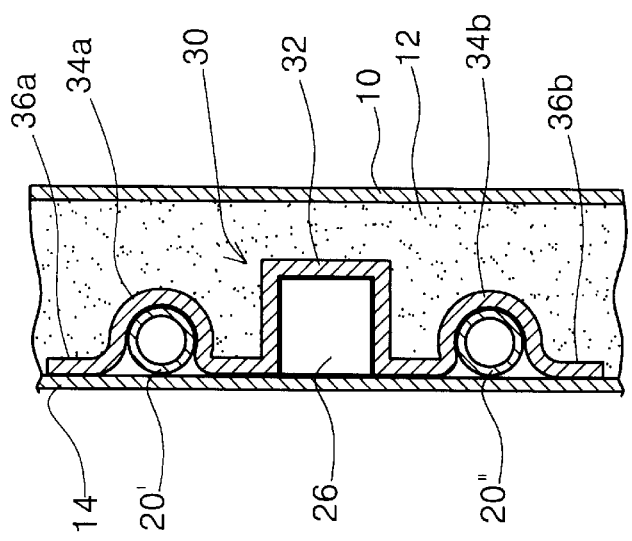

TEMPERATURE SENSING DEVICE FOR FOOD STORAGE CONTAINER

BACKGROUND OF THE INVENTION

1. Field of the Invention

The present invention relates to a food storage container for fermenting and/or storing foodstuffs at a preset temperature and, more particularly, to a temperature sensing device for such a food storage container, which is arranged outside the interior of the food storage container and is mechanically coupled to the exterior side of an inner liner as well as to at least a portion of the piping of an evaporator, such that an efficient thermal conduction is established therewith.

2. Discussion of the Related Art

Fermented foodstuffs such as kimchi and yogurt require an accurately controlled process in order to attain an optimum or particular taste, so that a given foodstuff is fermented (ripened) at a specific high temperature for an appropriate period of time. In order to preserve the fermented result and to retain the particular taste for a long period of time, the foodstuff is then stored under refrigerated conditions, immediately following the fermentation step, in a food storage container brought to and maintained at a carefully selected and precisely controlled low temperature. In order to carry out this process, the food storage container is equipped with internally integrated systems for containing a foodstuff to be processed.

In the operation of a food storage container as described above, the heating system operates according to a user selection of a desired degree of ripeness, which selectively ferments the foodstuff loaded therein, by maintaining the interior chamber at an appropriate temperature. Upon completion of the fermentation step, a refrigeration cycle is initiated and the cooling system operates to decrease the chamber's internal temperature and thereafter maintain (store) the foodstuff at an appropriate temperature. Throughout this process, the operation of the food storage container must be accurately controlled, especially in terms of the set temperature of the interior chamber. To this end, it is most important to accurately sense the chamber's internal temperature. An accurate sensing of this temperature, however, is very difficult due to several factors, such as the prevailing deviation in the temperature distribution exists in the chamber's interior during the operation of the food storage container, especially when driving the cooling system. Also, a convection phenomenon occurring between warm air and cold air results in generally lower temperatures concentrated in a lower chamber area and generally higher temperatures concentrated in an upper chamber area.

Though some of these difficulties in accurate temperature detection are present in any ordinary refrigerator, some are particularly acute in food storage containers such as that described above. For example, the normal operation begins with a foodstuff at approximately room temperature, which is then heated to a high temperature to allow for fermentation, after which time the heated result is immediately cooled to a low temperature. In such cases, the temperature differential which exists between the foodstuff itself and the ambient chamber temperature is apt to be more extreme than in an ordinary refrigeration process. Moreover, another heating cycle may begin following a previous cooling cycle, that is, while the chamber temperature is still very cold. Overall, depending on these interior conditions, there is the tendency for inconsistent reactions to cooling (or heating) efforts, such as the sudden turning on and off of the cooling system and the associate application of coolant within an evaporator, or the mere opening and closing of the internal chamber during operation. Yet, as stated above, the obtained taste of the kimchi or yogurt produced relies heavily on the accuracy of the entire process.

Typically, a food storage container, e.g., a refrigerator, a temperature sensor is disposed in the interior of the chamber and thereby serves to detect the internal temperature of the chamber in order to control the load operation of the food storage container based on the detected temperature. By arranging the temperature sensor in the interior of the chamber, however, the internally detected temperature is insufficient for load control operations. That is, due to the above described difficulties in temperature detection, the internal chamber exhibits undesired fluctuations in temperature as a compressor of the cooling system is controlled, i.e., turned on and off, based on the temperature detected conventionally. As a result of these deficiencies, the foodstuff being stored in the chamber cannot be preserved at an optimum state for a long period of time.

For example, when the detected temperature rises about 2~4° C. above a desired storage temperature of, say, 0° C., the compressor turns on, with the aim to decrease the detected temperature until reaching the set storage temperature. In this case, the temperature sensed by the internally situated temperature sensor corresponds to a local temperature at one portion of the storage chamber, namely, in the immediately adjacent area of the temperature sensor. On the other hand, where the operation of the food storage container is for fermentation, the internal temperature of the storage chamber is increased using a heater which is controlled to maintain a temperature range of, say, 18~24° C., turning on when the chamber temperature drops below 18° C. and turning off when the chamber temperature rises above 24° C. In practice, however, a variation in the internal temperature of the storage chamber proceeds slowly by virtue of an inefficient thermal conduction occurring in the chamber through the foodstuff, namely, kimchi, contained therein. As a result, a considerable temperature deviation exists within the storage chamber during the cooling/heating (load) operation, which greatly impedes efforts to ripen and preserve the stored foodstuff at a desired state. Due to the convection phenomenon and the resulting temperature differential between upper and lower portions of the storage chamber, excessive cooling may occur if the food storage container is controlled based on the temperature sensed at the upper portion, and excessive heating may occur if the food storage container is controlled based on the temperature sensed at the lower portion. The occurrence of any one of the aforementioned problems of the conventional art results in a deterioration in the state (taste) of the stored foodstuff, and particulary, the preservation period is reduced.

To partially combat these problems, the food storage container may be additionally provided with an acidity sensor in the case of a kimchi refrigerator. The acidity sensor can detect the degree of ripeness of kimchi stored in a kimchi storage chamber, which enables more accurate control, but the problem resulting from a temperature deviation occurring within the storage chamber remains and the preservation period is reduced accordingly. Such a reduction in food preservation period may be overcome by installing a plurality of temperature sensors to be distributed throughout the interior of the storage chamber, to take into consideration its uneven temperature distribution. This approach, however, increases production costs and contributes to the complexity of the entire system.

SUMMARY OF THE INVENTION

Therefore, it is an object of the invention to provide a temperature sensing device for a food storage container, which overcomes the problems of the conventional art.

It is another object of the present invention to provide a temperature sensing device for a food storage container, which is capable of accurately measuring the internal temperature of a storage chamber.

It is yet another object of the present invention to provide a temperature sensing device for a food storage container, which achieves an accurate on/off control for heating and cooling cycles of the food storage container.

It is still yet another object of the present invention to provide a temperature sensing device for a food storage container, which minimizes a temperature fluctuation existing in the storage chamber.

It is a further object of the present invention to provide a temperature sensing device for a food storage container, which maximizes a food preservation period.

In accordance with the present invention, this object is accomplished by providing, in a food storage container including an inner liner defining a storage chamber for storing foodstuff therein, an outer shell surrounding the inner liner and creating an interspace, an insulating material filling the interspace, and a cooling system having a compressor, a condenser and an evaporator wound around an outer surface of the inner liner to cool the storage chamber, a temperature sensing device comprising: a temperature sensor to sense a temperature of the storage chamber and generate an electrical signal representative of the sensed temperature; a control unit, having a microprocessor, to control the cooling system based on the electrical signal generated by the temperature sensor; and means for fixing the temperature sensor to the inner liner at a position near an inlet portion of the evaporator, such that the temperature sensor is in close contact with the outer surface of the inner liner to establish a thermally conductive path between the inner liner and the temperature sensor.

Typically, the food storage container includes a heater coil wound around the outer surface of the inner liner below the evaporator, to heat the storage chamber. The heater coil is also controlled by the control unit based on the electrical signal generated by the temperature sensor.

In the embodiments of the present invention, the temperature sensor fixing means comprises: a fixing bracket made of metal, having a sensor housing for tightly receiving the temperature sensor therein; and at least one pipe receptacle integrally extended from the sensor housing and fitting tightly around a first pipe portion of the inlet portion of the evaporator, to establish a thermally conductive path from the first pipe portion to the temperature sensor.

The temperature sensor fixing means may further comprise combinations of at least one extending flange integrally extended from the pipe receptacle, to increase a contact area of the fixing bracket on the inner liner; at least one snap-fit end integrally extended from the pipe receptacle to endow the pipe receptacle with an elasticity and an increased thermal conductivity with respect thereto; and an extending surface integrally extended from the sensor housing to a second pipe portion of the inlet portion of the evaporator, with one end of the extending surface having a tapered surface whose shape can be fitted in a gap existing between the second pipe portion and the outer surface of the inner liner. The temperature sensor fixing means may further comprise a restrainer provided at one end of the sensor housing to restrain a lateral movement of the temperature sensor within the sensor housing.

BRIEF DESCRIPTION OF THE DRAWINGS

The above objects, and other features and advantages of the present invention, will become more apparent after a reading of the following detailed description when taken in conjunction with the accompanying drawings, wherein the same elements are denoted by like reference numerals, in which:

FIGS. 2A, 2B, and 2C are cross-sectional views taken along line II—II of FIG. 1, respectively illustrating the mounted state of a fixing bracket of the temperature sensing device according to first, second, and third embodiments of the present invention;

DESCRIPTION OF THE PREFERRED EMBODIMENTS

Figure 1:
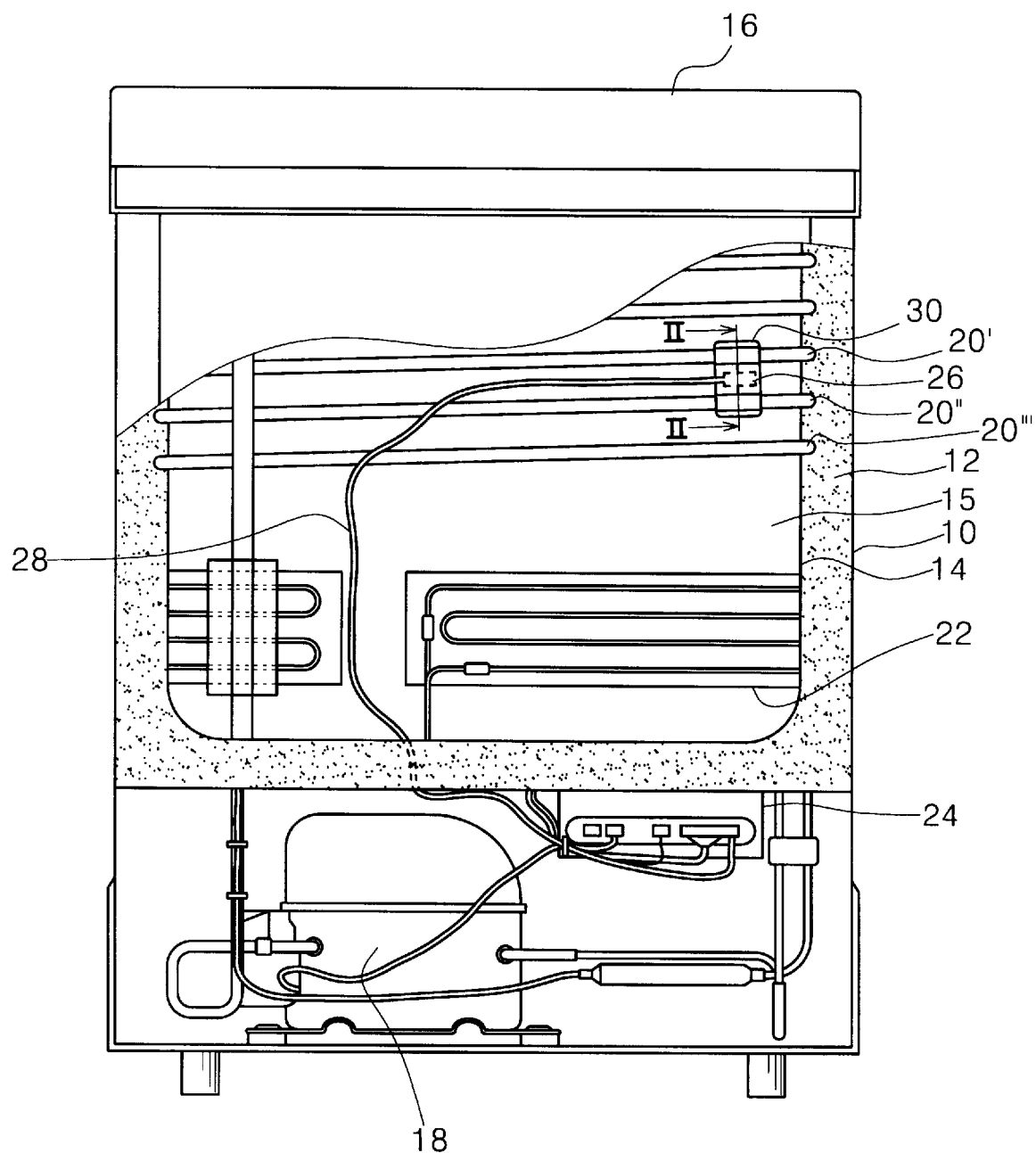
FIG. 1 is a partially cut-away, elevational view of a food storage container, illustrating a state in which a temperature sensing device according to a preferred embodiment of the present invention is mounted to a food storage container.

Referring to FIG. 1, a food storage container, to which the present invention is applied, is largely comprised of an outer shell 10 establishing the exterior shape of the food storage container and an inner liner 14, fitted inside and spaced with respect to the outer shell, establishing the size of a storage chamber 15 for containing a foodstuff, such as kimchi, to be fermented and stored. The outer shell 10 and inner liner 14 define a space filled with an insulating material 12. A hinged door 16 is provided at an upper end of the food storage container, to enable a user to gain access to the storage chamber 15. The food storage container also includes a compressor 18 for compressing a refrigerant; a condenser (not shown) for cooling the compressed refrigerant; an evaporator 20, in the form of a metal pipe wound tightly around the inner box 14, for receiving the cooled refrigerant from the condenser; a heater 22, arranged below the evaporator, for fermenting foodstuffs contained in the storage chamber 15; and a control unit 24 having a microprocessor for controlling the respective operations of the compressor 18 and heater 22 in accordance with preset operational conditions for fermentation and storage. In the present invention, continuous portions of the metal piping constituting the evaporator 20 are denoted by reference numerals 20', 20'', and 20'''.

In the food storage container having the above configuration, the control unit 24 controls the driving of the compressor 18 to maintain the storage chamber 15 at a desired temperature, thereby allowing the stored foodstuff to be preserved in a uniformly refrigerated state. For this control, the sensed temperature of the storage chamber 15 is determined by a temperature sensor 26 for input as an electrical signal to a microcomputer (not shown) included in the control unit 24 via a wire cable 28. Preferably, the temperature sensor 26 of the present invention is arranged at a region near an inlet portion of the evaporator 20, where the fastest variation in the temperature is exhibited between on and off states of the compressor 18.

The inlet portion of the evaporator 20 is where the refrigerant compressed by the compressor 18 is introduced into the evaporator 20 after passing through the condenser. Therefore, in the preferred embodiments of the present invention, the inlet portion includes the first three windings of the evaporator 20, namely, a pipe portion 20''', depicted as the lowermost winding of the evaporator, followed continuously by pipe portions 20'' and 20'. The region near the inlet portion of the evaporator can be defined as including the region of the inner liner 14 where the inlet portion of the evaporator is wound, as well as the inlet portion itself. The evaporator 20 is positioned on the inner liner 14 such that its inlet portion substantially corresponds to an intermediate portion of the storage chamber 15, midway between an upper chamber area having a concentration of generally higher temperatures and a lower chamber area having a concentration of generally lower temperatures.

The piping of the evaporator 20 extends spirally along the outer surface of the inner liner 14, beginning at a position well above the lower end of the inner liner and extending upward. Typically, the outlet (not shown) of the evaporator 20 is located at or near the upper end of the inner liner 14. In the illustrated case, the temperature sensor 26, arranged at the region near the inlet portion of the evaporator 20, is disposed on the outer surface of the inner liner 14 between the pipe portions 20" and 20' and in direct mechanical contact with those portions of the evaporator 20. Therefore, the temperature sensing device of the present invention can directly sense a variation in temperature in the storage chamber 15 resulting from changes in the state of the refrigerant, so that the temperature variation occurring in the evaporator 20 is directly and accurately reflected in the on/off control of the compressor 18. Similarly, during the fermentation step, the temperature sensor device of the present invention can directly sense a variation in temperature in the storage chamber 15 due to the operation of the heater 22, so that the temperature variation is directly and accurately reflected in driving the heater coils.

Since both the compressor and heater are controlled based on the temperature sensed by the temperature sensor 26 arranged on one or more of the pipe portions 20', 20" and 20''' included in the inlet portion of the evaporator 20 and on the outer surface of the inner liner 14 near the inlet portion, any variation in the internal temperature of the storage chamber 15 can be directly detected. Accordingly, a food storage container adopting the temperature sensing device of the present invention can rapidly and accurately respond to minute temperature variations, by an appropriate on/off control of the compressor 18 and heater 22 based on the temperature sensed by the temperature sensor 26.

Moreover, according to the present invention, it is possible to minimize adverse effects caused by a temperature differential occurring in the storage chamber 15 due to a phenomenon of cold air concentrating at its lower portion in a storage mode, because the temperature sensor 26 is disposed at or near the inlet portion of the evaporator 20, that is, at a midpoint corresponding substantially to an intermediate section of the storage chamber, so that the thermal conduction of the inner liner 14 allows the temperature sensor to respond to a median internal temperature. At the same time, it is also possible to minimize adverse effects caused by a temperature differential occurring in the storage chamber 15 due to a phenomenon of warm air concentrating at its upper portion in a fermenting mode. Thus, an improvement in the system operation of the food storage container is achieved.

The temperature sensing device of the present invention includes a metallic structure for fixing the temperature sensor 26 to the outer surface of the inner liner 14, which will be described in conjunction with the remaining figures.

FIGS. 2A–2C illustrate the mounted state of a metallic fixing bracket of the temperature sensing device according to the present invention. The fixing bracket serves as a means for fixedly mounting the temperature sensor 26 to the inlet portion of the evaporator 20, such that the temperature sensor is held in close contact with the outer surface of the inner liner 14, creating a thermally conductive path from the storage chamber 15 to the temperature sensor, via the inner liner and the fixing bracket. To achieve the close contact between the outer surface of the inner liner 14 and the fixing bracket during manufacture of the food storage container, the fixing bracket is first installed on the inner liner and the assembly is mated with the outer shell 10, creating an interspace to be filled with insulation. Thereafter, the interspace is filled with the insulating material 12, to tightly press the fixing bracket against the outer surface of the inner liner 14. At the same time, the fixing bracket is also mounted to at least one pipe portion (20' and/or 20") of the evaporator 20, to establish a thermally conductive path from the pipe portion to the temperature sensor 26. A thermally conductive adhesive may also be employed between the fixing bracket and the inner liner 14, though the preferred embodiment of the present invention relies on a simple mechanical contact achieved by filling the interspace with an insulating material such as a reactive foam.

Referring to FIG. 2A, according to a first embodiment of the present invention, a fixing bracket 30 is provided with a sensor housing 32 for tightly receiving the temperature sensor 26, upper and lower pipe receptacles 34a and 34b each integrally extended from the sensor housing and fitting tightly around the corresponding pipe portions, i.e, the pipe portions 20' and 20", respectively, and extending flanges 36a and 36b each integrally extended from the pipe receptacles to increase the area contacting the inner liner 14. By virtue of the increased contact area, the fixing bracket 30 can provide better thermal coupling between the temperature sensor 26 and the inner liner 14.

Referring to FIG. 2B, according to a second embodiment of the present invention, a fixing bracket 40 is provided with a sensor housing 42 for tightly receiving the temperature sensor 26, upper and lower pipe receptacles 44a and 44b each integrally extended from the sensor housing and fitting tightly around the corresponding pipe portions, i.e, the pipe portions 20' and 20", respectively, and snap-fit ends 46a and 46b each integrally extended from the pipe receptacles to endow the pipe receptacles with an elasticity and thereby provide for a tight fit over the corresponding pipe portions of the evaporator 20. To install, the fixing bracket 40 is pressed firmly against the pipe portions 20' and 20" so that the snap-fit ends 46a and 46b expand to receive the pipe portions. Thus, when released, the snap-fit ends 46a and 46b increase the coupling force and thermal conductivity of the pipe receptacles 44a and 44b.

Referring to FIG. 2C, according to a third embodiment of the present invention, a fixing bracket 50 is configured such that a snap-fit coupling as in the second embodiment is provided to the evaporator 20 on one side only and a wedged surface contact point is provided on the other side between a pipe portion and the inner liner 14. That is, the fixing bracket 50 is provided with a sensor housing 52 for tightly receiving the temperature sensor 26 therein, an extending surface 55 extending upwardly from the sensor housing, a pipe receptacle 54b integrally extended from the sensor housing 52 and fitting tightly around an adjacent pipe portion, e.g., the pipe portion 20", and a snap-fit end 56b integrally extended from the pipe receptacle 54b as in the second embodiment. The end of the extending surface 55 of the fixing bracket 50 has a tapered surface 55a to be fitted in a gap between the evaporator piping and outer surface of the inner liner 14.

Figure 3:
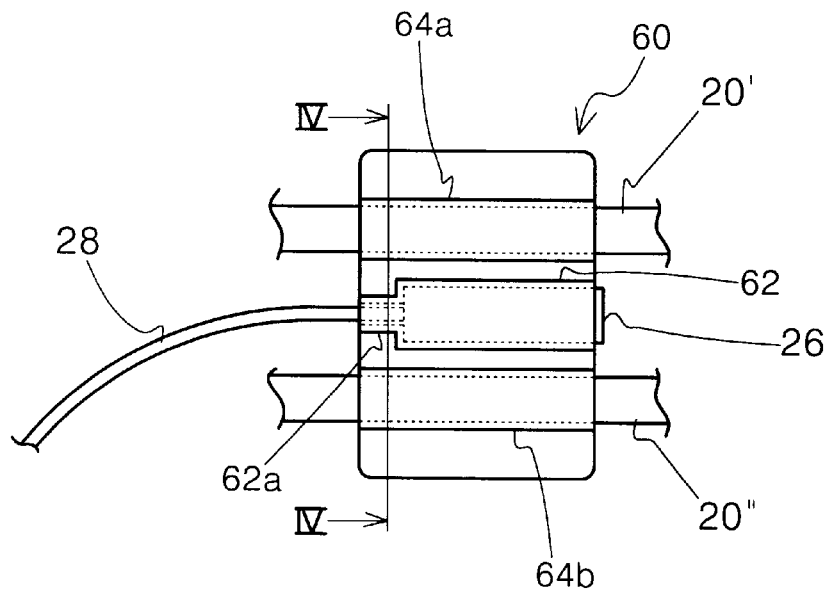
FIG. 3 is an elevational view illustrating the mounted state of a fixing bracket according to a fourth embodiment of the present invention.
Figure 4:
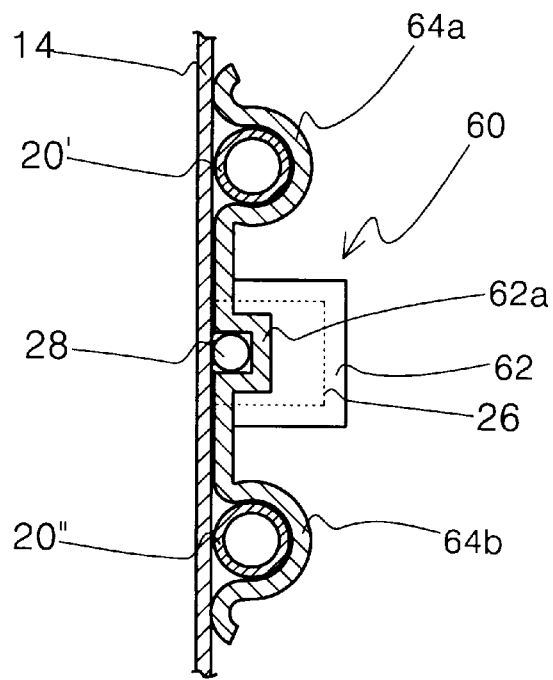
FIG. 4 is a cross-sectional view taken along line IV—IV of FIG. 3.

FIGS. 3 and 4 illustrate the mounted state of a fixing bracket 60 of the temperature sensing device according to a fourth embodiment of the present invention. The fixing bracket 60 has a sensor housing 62 for tightly receiving the temperature sensor 26 therein, and upper and lower pipe receptacles 64a and 64b integrally extended from the sensor housing and fitting tightly around the corresponding pipe portions. The fixing bracket 60 is also provided with a restrainer 62a at one end of the sensor housing 62, to restrain a lateral movement of the temperature sensor 26 within the sensor housing and to provide stress relief for the wire cable 28. Preferably, the restrainer 62a has a size smaller than the cross-section the temperature sensor 26, to prevent the temperature sensor from being separated from the sensor housing 62, but slightly larger than the cross-section of the wire cable 28 to firmly secure the wire cable.

As apparent from the above description, the present invention provides a temperature sensing device for a food storage container in which a temperature sensor is arranged on the outer surface of an inner liner of a storage chamber at a region corresponding to an inlet portion of an evaporator. By virtue of this temperature sensing device, it is possible to minimize an adverse effect caused by an uneven temperature distribution in the storage chamber, while more accurately controlling the respective on/off states of heating and cooling cycles.

Although the preferred embodiments of the invention have been disclosed for illustrative purposes, those skilled in the art will appreciate that various modifications, additions and substitutions are possible, without departing from the scope or spirit of the invention as disclosed in the accompanying claims.

What is claimed is:

1. In a food storage container including an inner liner defining a storage chamber for storing foodstuff therein, an outer shell surrounding the inner liner and creating an interspace, an insulating material filling the interspace, and a cooling system having a compressor, a condenser and an evaporator wound around an outer surface of the inner liner to cool the storage chamber, a temperature sensing device comprising:

a temperature sensor to sense a temperature of the storage chamber and generate an electrical signal representative of the sensed temperature;

a control unit, having a microprocessor, to control the cooling system based on the electrical signal generated by said temperature sensor; and means for fixing the temperature sensor to the inner liner at a position near an inlet portion of the evaporator, such that the temperature sensor is in close contact with the outer surface of the inner liner to establish a thermally conductive path between the inner liner and the temperature sensor.

2. The temperature sensing device as claimed in claim 1, wherein a heater coil is wound around the outer surface of the inner liner below the evaporator, to heat the storage chamber, said heater coil being controlled by said control unit based on the electrical signal generated by said temperature sensor.

3. The temperature sensing device as claimed in claim 1, wherein the inlet portion of the evaporator is centrally situated along a vertical axis of the storage chamber.

4. The temperature sensing device as claimed in claim 1, wherein the close contact between the temperature sensor and the outer surface of the inner liner is achieved by filling the interspace with an insulating material.

5. The temperature sensing device as claimed in claim 4, wherein the insulating material is a reactive foam.

6. The temperature sensing device as claimed in claim 1, wherein said temperature sensor fixing means comprises:

a fixing bracket made of metal, having a sensor housing for tightly receiving the temperature sensor therein; and at least one pipe receptacle integrally extended from the sensor housing and fitting tightly around a first pipe portion of the inlet portion of the evaporator, to establish a thermally conductive path from the first pipe portion to the temperature sensor.

7. The temperature sensing device as claimed in claim 6, said temperature sensor fixing means further comprising at least one extending flange integrally extended from said pipe receptacle, to increase a contact area of the fixing bracket on the inner liner.

8. The temperature sensing device as claimed in claim 6, said temperature sensor fixing means further comprising at least one snap-fit end integrally extended from said at least one pipe receptacle to endow said at least one pipe receptacle with an elasticity and an increased thermal conductivity with respect thereto.

9. The temperature sensing device as claimed in claim 6, said temperature sensor fixing means further comprising an extending surface integrally extended from the sensor housing to a second pipe portion of the inlet portion of the evaporator, one end of said extending surface having a tapered surface whose shape can be fitted in a gap existing between the second pipe portion and the outer surface of the inner liner.

10. The temperature sensing device as claimed in claim 6, said temperature sensor fixing means further comprising a restrainer provided at one end of the sensor housing to restrain a lateral movement of the temperature sensor within the sensor housing.

11. The temperature sensing device as claimed in claim 7, said temperature sensor fixing means further comprising a restrainer provided at one end of the sensor housing to restrain a lateral movement of the temperature sensor within the sensor housing.

12. The temperature sensing device as claimed in claim 8, said temperature sensor fixing means further comprising a restrainer provided at one end of the sensor housing to restrain a lateral movement of the temperature sensor within the sensor housing.

13. The temperature sensing device as claimed in claim 9, said temperature sensor fixing means further comprising a restrainer provided at one end of the sensor housing to restrain a lateral movement of the temperature sensor within the sensor housing.

* * * * *